(12) United States Patent
Bruant et al.

(10) Patent No.: US 11,312,094 B2
(45) Date of Patent: Apr. 26, 2022

(54) TIRE CASING AND WHEEL ASSEMBLY COMPRISING AN ENHANCED SELF-SEALING PRODUCT

(71) Applicant: COMPAGNIE GENERALE DES ETABLISSEMENTS MICHELIN, Clermont-Ferrand (FR)

(72) Inventors: Remi Bruant, Clermont-Ferrand (FR); Christopher Careme, Clermont-Ferrand (FR); Simona Ceccia, Clermont-Ferrand (FR); Jose Merino Lopez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 396 days.

(21) Appl. No.: 16/470,502

(22) PCT Filed: Dec. 1, 2017

(86) PCT No.: PCT/FR2017/053350
§ 371 (c)(1),
(2) Date: Jun. 17, 2019

(87) PCT Pub. No.: WO2018/109305
PCT Pub. Date: Jun. 21, 2018

(65) Prior Publication Data
US 2020/0122420 A1 Apr. 23, 2020

(30) Foreign Application Priority Data
Dec. 16, 2016 (FR) ...................................... 1662665

(51) Int. Cl.
*B29C 73/22* (2006.01)
*B29D 30/06* (2006.01)
(Continued)

(52) U.S. Cl.
CPC ........ *B29D 30/0685* (2013.01); *B29C 73/163* (2013.01); *B29C 73/22* (2013.01);
(Continued)

(58) Field of Classification Search
None
See application file for complete search history.

(56) References Cited

U.S. PATENT DOCUMENTS 3,563,294 A 2/1971 Chien
4,287,928 A * 9/1981 Hallman ............... B29C 73/163
152/504

(Continued)

FOREIGN PATENT DOCUMENTS

CN 101563242 10/2009
CN 201856585 U 6/2011
(Continued)

OTHER PUBLICATIONS

Kageyama, DE2725673A1 English Translation 1977 (Year: 1977).*

*Primary Examiner* — Jacob T Minskey
*Assistant Examiner* — Adrien J Bernard
(74) *Attorney, Agent, or Firm* — Cozen O'Connor

(57) ABSTRACT

An assembly of a pneumatic tire and of a wheel, the pneumatic tire (10) being fitted to the wheel. The assembly comprises first and second self-sealing products housed in the internal volume (V) of the pneumatic tire (10). The first self-sealing product, referred to as solid self-sealing product (OS), covers a predetermined part of the internal surface of the pneumatic tire (10). The relative position of this predetermined part in the pneumatic tire (10) does not substantially vary under the effect of gravity. The second self-sealing product, referred to as liquid self-sealing product (OL), is in the liquid form.

24 Claims, 2 Drawing Sheets

(51) Int. Cl.
  *B29C 73/16* (2006.01)
  *B29L 30/00* (2006.01)
(52) U.S. Cl.
  CPC ............... *B29D 2030/0695* (2013.01); *B29D 2030/0697* (2013.01); *B29L 2030/00* (2013.01)

(56) References Cited

U.S. PATENT DOCUMENTS

2010/0331448 A1* 12/2010 Ichikawa ............. B29C 73/163
                                                            523/166
2013/0263990 A1    10/2013 Voge et al.
2016/0167455 A1     6/2016 Majumdar et al.

FOREIGN PATENT DOCUMENTS

| CN | 202952780 U | 5/2013 | |
| CN | 103717381 | 4/2014 | |
| DE | 2725673 A1 * | 12/1977 | ........... B29C 73/163 |
| DE | 198 39 911 | 3/2000 | |
| DE | 202015006945 U | 10/2015 | |
| EP | 0135463 | 3/1985 | |
| EP | 2335913 A1 * | 6/2011 | ........... B29C 73/163 |
| FR | 2 923 750 | 5/2009 | |

* cited by examiner

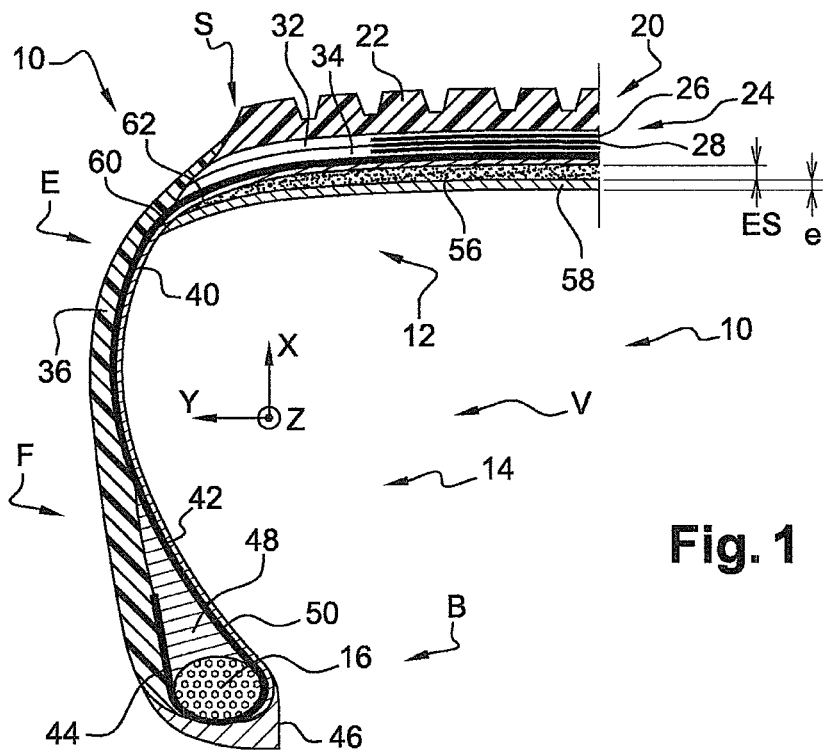
Fig. 1
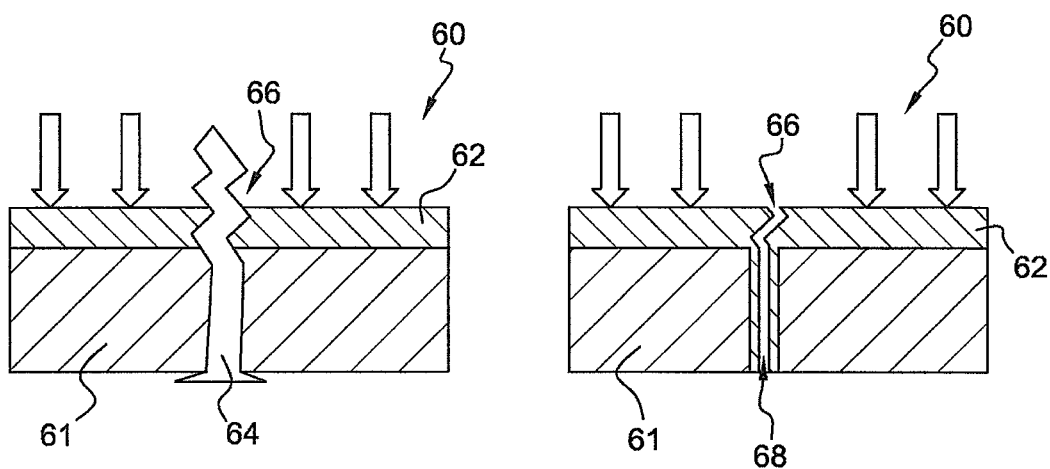
Fig. 2
(PRIOR ART)
Fig. 3
(PRIOR ART)

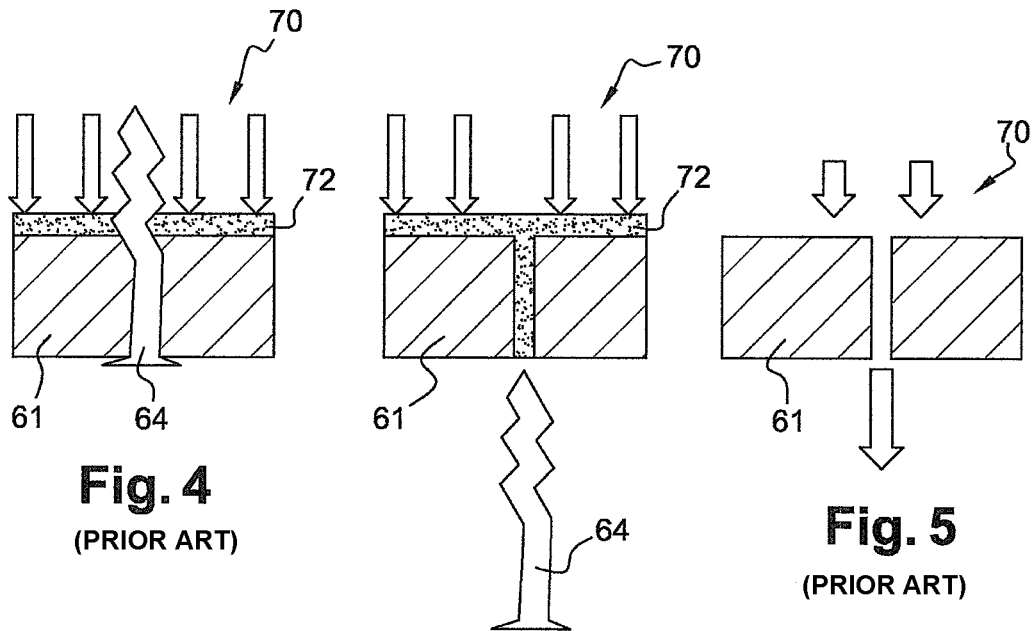
Fig. 4 (PRIOR ART)
Fig. 5 (PRIOR ART)
Fig. 6 (PRIOR ART)
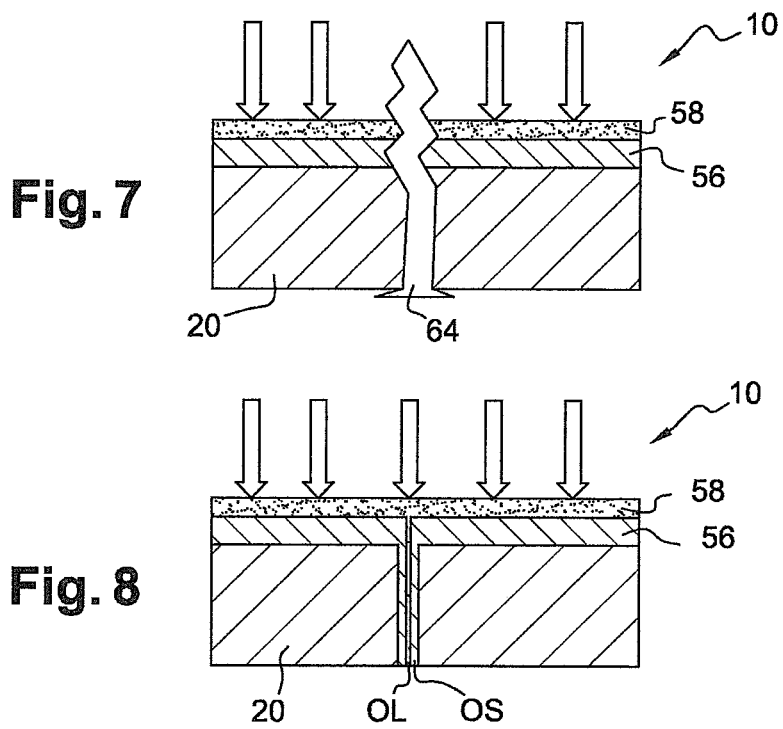
Fig. 7
Fig. 8

TIRE CASING AND WHEEL ASSEMBLY COMPRISING AN ENHANCED SELF-SEALING PRODUCT

RELATED APPLICATIONS

This is a U.S. National Phase Application under 35 USC 371 of International Application PCT/FR2017/053350 filed on Dec. 1, 2017.

This application claims the priority of French application no. 1662665 filed Dec. 16, 2016, the entire content of which is hereby incorporated by reference.

FIELD OF THE INVENTION

The invention relates to the field of pneumatic tire and wheel assemblies.

It more particularly relates to a pneumatic tire and wheel assembly which is resistant to the effects of a puncture.

BACKGROUND OF THE INVENTION

Normally, a pneumatic tire comprises an airtight internal layer delimiting the internal volume of the pneumatic tire.

During its use, the pneumatic tire may suffer a perforation, for example as the result of the penetration of a perforating article, such as a screw or a nail, which can result in it becoming flat more or less suddenly. At least two solutions for overcoming the consequences of a perforation of a pneumatic tire are known in the prior art.

The first solution, referred to as preventative solution, consists in positioning, in contact with the airtight internal layer, during the manufacture of the pneumatic tire, an additional layer of a product of very low stiffness which can easily be deformed. This is because, when a perforation occurs, the product of the additional layer, due to its flexibility and its ability to easily be deformed, coats the perforating article and, in the event of withdrawal of the latter, penetrates the perforation, fills the latter in and thus limits or prevents an escape of air which is a result of the perforation of the pneumatic tire. Such a product, known as solid self-sealing product, is, for example, described in the document WO 2012/052663.

The second solution, referred to as curative solution, consists in injecting, after a perforation, a liquid product comprising filling-in agents, such as rubber particles or fibres, into the pneumatic tire. This product will then penetrate the perforation and limit or prevent an escape of air which is a result of the puncturing of the pneumatic tire. Such a product, known as liquid self-sealing product or puncture-resistant product, is, for example, described in the document WO 2011/148853.

Pneumatic tires equipped with a solid self-sealing product deployed in the internal cavity facing the crown in the form of a layer with a thickness of 3 to 5 mm are now sold. However, it is found that these pneumatic tires exhibit an insufficient performance with some types of perforating articles, such as screws.

In order to overcome this problem, it is naturally possible to attempt to increase the thickness of the layer of solid self-sealing product up to, for example, 6 to 7 mm. However, this solution does not completely deal with the problem and penalizes the performance qualities of the pneumatic tire, in particular by substantially increasing its rolling resistance and by reducing its endurance due to the greater heating of the crown related to the thick layer of self-sealing product.

SUMMARY OF THE INVENTION

It is thus one object of the invention to provide a pneumatic tire and wheel assembly comprising a self-sealing product which is more effective than the solutions of the prior art without resulting in the losses recalled above.

To this end, one aspect of the invention relates to an assembly of a pneumatic tire and of a wheel, the pneumatic tire being mounted, or fitted, to the wheel, characterized in that it comprises first and second self-sealing products housed in the internal volume of the pneumatic tire, the first self-sealing product, referred to as solid self-sealing product, forming a layer against a predetermined part of the internal surface of the pneumatic tire, the relative position of this predetermined part in the pneumatic tire not substantially varying under the effect of gravity, the second self-sealing product, referred to as liquid self-sealing product, being in the liquid form, the relative position of the second product varying under the effect of gravity in the internal volume (V) of the pneumatic tire in order to make it possible to act simultaneously with the first self-sealing product.

The inventors observed, on carrying out perforation tests on pneumatic tires, that the effectiveness of a solid or liquid self-sealing product in filling in the perforation depended on the geometry of this perforation but also on the time at which the perforating article was withdrawn from the pneumatic tire.

Thus, the inventors noticed that a liquid self-sealing product, as a result of its high ability to yield, had a tendency to escape from the pneumatic tire at the time of the withdrawal of the article, which was less the case with the solid self-sealing product, which, on the contrary, managed in this period of time to fill in the perforation. On the other hand, the inventors noticed that a solid self-sealing product, as a result of its reduced ability to yield in comparison with a liquid self-sealing product, managed with more difficulty to fill in the entire volume of a perforation due to the penetration of perforating article of complex shape, such as a screw.

With the help of these observations, the inventors were able to determine that the solid and liquid self-sealing products, normally used mutually exclusively (the first being used preventively and the second curatively), had complementary properties. They thus had the idea of integrating them in a fitted assembly so that they can act simultaneously, at the time when the perforation occurs.

By virtue of the joint use of a solid self-sealing product and of a liquid self-sealing product, performance qualities in filling in the perforation are obtained which are markedly better than those obtained with each product used separately, as a result of a synergistic effect between the two categories of product.

Preferably, the liquid self-sealing product has an equivalent thickness e of between 0.3 and 2.5 mm, this equivalent thickness being defined by the relationship $$e = \frac{w}{WD\gamma},$$

in which:
w is the weight of liquid self-sealing product,
W is the width of the tread of the pneumatic tire,
D is the internal development of the pneumatic tire, and
γ is the density of the liquid self-sealing product.

Advantageously, the equivalent thickness of the liquid self-sealing product is between 0.4 and 1.5 mm, preferably between 0.5 and 1.2 mm.

According to a specific embodiment of the invention, the dynamic viscosity of the liquid self-sealing product is less than 1000 Pa·s within a temperature range of between −15° C. and 60° C., for example less than 100 Pa·s, and preferably greater than 0.01 Pa·s.

Preferably, the layer of solid self-sealing product has a thickness of less than 5 mm, preferably of between 2.5 and 3.5 mm.

According to a specific embodiment of the invention, the internal surface of the pneumatic tire is formed of an airtight layer, the airtight layer comprising, for example, butyl rubber.

According to a specific embodiment of the invention, the predetermined part covered with the solid self-sealing product is a part facing the crown of the pneumatic tire.

In order to favour the sealing, the liquid self-sealing product comprises filling-in agents, such as rubber particles and fibres, dispersed in a liquid solvent, the liquid solvent comprising, for example, water.

According to a specific embodiment of the invention, the liquid self-sealing product comprises a latex of natural rubber in an aqueous base.

In order to prevent the liquid self-sealing product from freezing, the liquid self-sealing product comprises a glycol-based antifreeze.

In order to even further promote the sealing, the liquid self-sealing product comprises particles with a diameter of between 10 and 800 μm, for example crumb rubbers obtained by grinding worn pneumatic tires, the diameter of more than 70% by number of the particles preferably being between 10 and 300 μm.

Advantageously, the solid self-sealing product comprises a major, or predominant, elastomer chosen from:
  an unsaturated diene elastomer,
  a butyl-based elastomer,
  a thermoplastic elastomer, for example a stirene elastomer
    or a thermoplastic copolymer comprising polystyrene
    and polyisobutylene blocks, and
  a polyurethane.

Preferably, the major, or predominant, elastomer being an unsaturated diene elastomer, the solid self-sealing product additionally comprises between 30 and 90 phr of a hydrocarbon resin and between 0 and 30 phr of a filler.

Preferably, the major, or predominant, elastomer being an unsaturated diene elastomer, the solid self-sealing product additionally comprises a liquid plasticizer at a content of between 0 and 60 phr or additionally comprises between 0.5 and 15 phr of thiuram polysulfide.

According to a specific embodiment of the invention, the major, or predominant, elastomer being a butyl-based elastomer, the major, or predominant, elastomer is a butyl rubber of high molecular weight, and the solid self-sealing product additionally comprises a butyl elastomer of low molecular weight.

Preferably, the number-average molecular weight of the butyl rubber of high molecular weight is greater than 120 000 g/ml and preferably greater than 150 000 g/ml.

According to a specific embodiment of the invention, the major, or predominant, elastomer being a thermoplastic elastomer, the solid self-sealing product additionally comprises an extending oil at a content of at least 100 phr and preferably greater than 250 phr.

Preferably, the solid self-sealing product has a Shore 00 hardness of less than 10 and preferentially equal to 0.

The invention also relates to a process for the manufacture of an assembly of a pneumatic tire and of a wheel, characterized in that the assembly is according to the invention and in that the liquid self-sealing product is housed in the pneumatic tire before it is mounted, or fitted, to the wheel.

Another aspect of the invention relates to a process for the manufacture of an assembly of a pneumatic tire and of a wheel, wherein the assembly is according to an embodiment of the invention and wherein the liquid self-sealing product is introduced into the pneumatic tire after it has been mounted, or fitted, to the wheel via a valve for inflation of the pneumatic tire and before the inflation of the pneumatic tire.

Another aspect of the invention relates to a process for deploying a self-sealing system in an assembly of a pneumatic tire and of a wheel, wherein the assembly is according to an embodiment of the invention and wherein it comprises the following stages:
  a pneumatic tire equipped with a layer comprising the solid self-sealing product is taken;
  the pneumatic tire is mounted, or fitted, to a wheel rim in order to obtain a pneumatic tire and wheel assembly defining an internal volume;
  the liquid self-sealing product is introduced into the internal volume.

According to a specific embodiment of the invention, the liquid self-sealing product is introduced into the internal volume of the pneumatic tire before the pneumatic tire is mounted, or fitted, to the wheel rim.

According to a specific embodiment of the invention, the assembly of a pneumatic tire and of a wheel being provided with an inflation valve, the liquid self-sealing product is introduced through the said inflation valve after the pneumatic tire has been mounted, or fitted, to the wheel rim.

BRIEF DESCRIPTION OF THE DRAWINGS

A better understanding of the invention will be obtained on reading the description which will follow, given solely by way of non-limiting example and made with reference to the drawings, in which:

FIG. 1 is a view in radial section of a pneumatic tire according to an embodiment of the invention;

FIG. 2 (prior art) is a diagrammatic view in section of a pneumatic tire provided with a layer of solid self-sealing product according to the prior art, pierced by a screw;

FIG. 3 (prior art) is a similar view to FIG. 2, the screw having been withdrawn from the tire after a predetermined period of time;

FIG. 4 (prior art) is a similar view to FIG. 2 of a pneumatic tire provided with a layer of liquid self-sealing product according to the prior art, pierced by a screw;

FIG. 5 (prior art) is a similar view to FIG. 2, the screw having been withdrawn from the tire;

FIG. 6 (prior art) is a similar view to FIG. 5, the screw having been withdrawn from the tire after a predetermined period of time;

FIG. 7 is a similar view to FIG. 2 of a pneumatic tire provided with a layer of solid self-sealing product and with a layer of liquid self-sealing product according to an embodiment of the invention;

FIG. 8 is a similar view to FIG. 7, the screw having been withdrawn from the tire.

DETAILED DESCRIPTION OF THE DRAWINGS

A pneumatic tire according to one embodiment of the invention denoted by the general reference 10 has been represented in FIG. 1.

In this figure, axes X, Y and Z have been represented which are orthogonal to one another and which correspond to the normal radial (X), axial (Y) and circumferential (Z) orientations of the pneumatic tire 10.

The pneumatic tire 10 forms part of an assembly of a pneumatic tire and of a wheel on which it is intended to be fitted. The wheel, which can in particular be a wheel of a motor vehicle of passenger vehicle type, has not been represented in the figures.

Conventionally, the pneumatic tire 10 comprises a crown S extended by two shoulders E, two sidewalls F and two beads B. A single sidewall F, a single shoulder E and a single bead B are represented in the figures.

Two bead wires 16 (just one is represented) are embedded in the beads B. The two bead wires 16 are arranged symmetrically with respect to a median radial plane M of the pneumatic tire.

Each bead wire 16 exhibits symmetry of revolution about a reference axis. This reference axis, substantially parallel to the direction Y, is substantially coincident with an axis of revolution of the pneumatic tire.

The crown S comprises a tread 20, provided with patterns 22, and also a reinforcement 24. This reinforcement 24 comprises metal or textile reinforcing plies 26, 28 embedded in rubber masses 32 and 34.

The pneumatic tire 10 also comprises an airtight inner liner layer 40 and also a carcass ply 42. The layer 40 delimits, at least in part, the internal volume V of the pneumatic tire 10 and comprises, for example, butyl rubber. The layer 40 and the ply 42 are of toroidal general shape and are both coaxial with the bead wires 16. The layer 40 and the ply 42 extend between the two annular bead wires 16 of the pneumatic tire 10 while passing through the crown S.

In the bead B of the pneumatic tire 10, the carcass ply 42 comprises a part 44 folded over around the bead wire 16. The bead B also comprises an annular protective rubber mass 46 intended to make it possible, in part, to radially and axially attach the pneumatic tire 10 to a rim.

The bead B of the pneumatic tire 10 also comprises a rubber mass 48 for the stuffing of a volume included between the folded-over part 44 of the carcass ply 42 and a part 50 of the carcass ply 42 axially opposite the folded-over part 44.

The pneumatic tire 10 also comprises, in its internal volume V, first and second self-sealing products housed in the internal volume of the pneumatic tire.

The first self-sealing product, referred to as solid self-sealing product OS, covers a predetermined part of the internal surface of the pneumatic tire 10. The relative position of this predetermined part in the pneumatic tire does not substantially vary under the effect of gravity.

In the example represented in FIGS. 1, 7 and 8, the predetermined part in question is a layer 56 of solid self-sealing product of the pneumatic tire 10, which is positioned radially in an internal manner with respect to the airtight layer 40. In this way, the predetermined part covered with the solid self-sealing product OS is a part facing the crown S of the pneumatic tire. In particular, this layer 56 of solid self-sealing product is applied in contact with the airtight internal layer 40.

The layer 56 of solid self-sealing product OS has a thickness ES of less than 4 mm, preferably of between 2.5 and 3.5 mm.

For example, the solid self-sealing product OS exhibits, at an excitation frequency of 10 Hz and for any temperature value within a temperature range of between 10° C. and 150° C., a loss factor tan δ of less than 0.8 and a complex dynamic shear modulus G* of between 0.01 and 0.1 MPa.

The solid self-sealing product (OS) can also exhibit a Shore 00 hardness of less than 10 and preferably equal to 0.

The second self-sealing product, referred to as liquid self-sealing product OL, is positioned in the form of a mass 58 of liquid self-sealing product of the pneumatic tire 10.

As the second self-sealing product OL is in the liquid form, unlike the layer 56 of solid self-sealing product OS, the relative position of the mass 58 of liquid self-sealing product has a tendency to vary under the effect of gravity, and during the running of the pneumatic tire.

For example, the dynamic viscosity of the liquid self-sealing product OL is less than 1000 Pa·s within a temperature range of between −15° C. and 60° C. For example, this dynamic viscosity is less than 100 Pa·s. The dynamic viscosity is preferably greater than 0.01 Pa·s.

During running, the mass 58 of liquid self-sealing product OL has a tendency to be distributed over the entire circumference of the tire 10, so as to form a second layer 58 of self-sealing product OL. The state of the layers 56, 58 of solid self-sealing product OS and liquid self-sealing product OL is represented in particular in FIG. 1.

The layer 58 of liquid self-sealing product OL preferably has an equivalent thickness $$e = \frac{w}{WD\gamma}$$

of between 0.3 and 2.5 mm. In the relationship $$e = \frac{w}{WD\gamma}:$$

w is the weight of liquid self-sealing product OL,
W is the width of the tread 20 of the pneumatic tire 10,
D is the internal development of the pneumatic tire 10, and
γ is the density of the liquid self-sealing product OL.

For example, the equivalent thickness e of the liquid self-sealing product is between 0.4 and 1.5 mm, preferably between 0.5 and 1.2 mm.

Advantageously, in order to improve the filling in of a perforation, the liquid self-sealing product OL comprises filling-in agents, such as rubber particles and fibres, dispersed in a liquid solvent, such as water. For example, the liquid self-sealing product comprises a latex of natural rubber in an aqueous base.

In order to prevent the liquid self-sealing product OL from freezing, it comprises, in its composition, a glycol-based antifreeze.

Still so as to improve the filling-in performance qualities, the liquid self-sealing product OL additionally comprises particles with a diameter of between 10 and 800 μm. They can, for example, be crumb rubbers obtained by grinding worn pneumatic tires. The number-average diameter of more than 70% of these particles is preferably between 10 and 300 μm.

The composition of the solid self-sealing product OS will now be described in detail.

In what follows, unless otherwise indicated, all the percentages (%) shown are % by weight. Furthermore, in the elastomer compositions of the present description, the abbreviation "phr" means parts by weight per hundred parts of solid elastomer.

The solid self-sealing product OS comprises a predominant elastomer chosen from:
- an unsaturated diene elastomer,
- a butyl-based elastomer,
- a thermoplastic elastomer, for example a stirene elastomer or a thermoplastic copolymer comprising polystyrene and polyisobutylene blocks, and
- a polyurethane.

Thus, in a first embodiment of the invention, the predominant elastomer of the solid self-sealing product OS is an unsaturated diene elastomer. In this first embodiment, the solid self-sealing product OS additionally comprises between 30 and 90 phr of a hydrocarbon resin and between 0 and 30 phr of a filler and between 0.5 and 15 phr of thiuram polysulfide.

In a second embodiment of the invention, the predominant elastomer of the solid self-sealing product OS is an unsaturated diene elastomer. In this second embodiment, the solid self-sealing product OS additionally comprises between 30 and 90 phr of a hydrocarbon resin and between 0 and 30 phr of a filler and a liquid plasticizer at a content of between 0 and 60 phr. The glass transition temperature Tg of this liquid plasticizer will, for example, be less than −20° C.

In a third embodiment of the invention, the predominant elastomer of the solid self-sealing product OS is a butyl-based elastomer. For example, the predominant elastomer is a butyl rubber of high molecular weight, and the solid self-sealing product OS additionally comprises a butyl elastomer of low molecular weight. The number-average molecular weight of the butyl rubber of high molecular weight will in particular be greater than 120 000 g/ml and preferably greater than 150 000 g/ml.

In other embodiments, the predominant elastomer of the solid self-sealing product OS is a thermoplastic, for example a stirene elastomer or a thermoplastic copolymer comprising polystyrene and polyisobutylene blocks.

Thus, in a fourth embodiment of the invention, the predominant elastomer of the solid self-sealing product OS is a stirene elastomer. In this fourth embodiment, the solid self-sealing product OS additionally comprises more than 100 phr of an extending oil, for example more than 250 phr of this oil, and more than 20 phr of a hydrocarbon resin. The glass transition temperature Tg of this hydrocarbon resin will, for example, be greater than 0° C.

In a fifth embodiment of the invention, the predominant elastomer of the solid self-sealing product OS is a thermoplastic copolymer comprising polystyrene and polyisobutylene blocks. In this fifth embodiment, the solid self-sealing product OS additionally comprises at least 100 phr of an extending oil.

The properties of the pneumatic tire 10 and the synergy introduced by the supplementary presence of the two solid and liquid self-sealing products OS and OL will now be explained with reference to FIGS. 2 to 8. In these figures, the arrows represent the direction in which gravity is exerted.

A pneumatic tire 60 according to the prior art, provided with a tread 61 and with a layer of solid self-sealing product 62, after having been pierced by a screw 64, causing a perforation 66 of the tire, has been represented in FIG. 2 (prior art).

As can be seen in FIG. 3 (prior art), after the screw 64 has been pulled out, the solid self-sealing product 62 partially fills in the perforation 66 but, due to the complex geometry of the screw 64, an interstice 68 remains even one hour after the perforation. This is because the viscosity of the solid self-sealing product OS means that it does not escape from the perforation 66 but prevents it from reaching certain regions of the perforation 66.

A pneumatic tire 70 according to the prior art, provided with a tread 61 and with a layer of liquid self-sealing product 72, after having been pierced by a screw 64, causing a perforation 66 of the tire, has been represented in FIG. 4 (prior art).

As can be seen in FIG. 5 (prior art), after the screw 64 has been pulled out, the liquid self-sealing product 62 completely fills in the perforation 66. This is because the liquid state of the self-sealing product allows it to fit into the entire volume of the perforation 66 despite the complex shape of the screw 64. On the other hand, as illustrated in FIG. 6, once the screw has been pulled out of the pneumatic tire 70, there is nothing left to hold back the liquid self-sealing product 62, which flows out of the tire 70 and no longer fills in the perforation 66 at all.

These disadvantages are avoided by virtue of the pneumatic tire 10 according to the invention illustrated diagrammatically in FIGS. 7 and 8.

This is because, as recalled in FIG. 7, the pneumatic tire 10 comprises the tread 20, the layer 56 of solid self-sealing product OS and the layer 58 of liquid self-sealing product OL.

Thus, as can be seen in FIG. 8, when the screw 64 is removed from the pneumatic tire 10, the presence of the solid self-sealing product OS means that the perforation 66 remains filled in as the liquid self-sealing product OL does not escape from the tire 10. In addition, the interstice 68, which would have remained if the tire had contained only a solid self-sealing product, is filled in by the liquid self-sealing product OL, which can be inserted therein by virtue of the fact that it is in the liquid state.

Tests have made it possible to establish a comparative table of the performance qualities of the pneumatic tires of the prior art and of the pneumatic tire according to the invention faced with a running test on a support strewn with screws with a length of 40 mm.

More specifically, the table below makes it possible to compare the performance qualities:
- of a first pneumatic tire comprising only a solid self-sealing product having a composition including natural rubber, a plasticizer and a resin, such as that illustrated in FIGS. 2 and 3;
- of a second pneumatic tire comprising only a liquid self-sealing product sold commercially under the name puncture-resistant product, such as that illustrated in FIGS. 4 to 6; and
- of a third pneumatic tire in accordance with the invention (in particular such as that illustrated in FIGS. 1 and 7 to 8, namely provided with two solid and liquid self-sealing products according to one of the compositions touched on above).

The degree of cover of the different tires, calculated at different moments in the running test, is shown in the table below. In this instance, the degree of cover is defined as being the result of the calculation, defined as percentage, of the number of perforating articles not exhibiting escape, divided by the total number of perforating articles inserted into the pneumatic tire tested.

|  | Pneumatic tire provided only with a solid self-sealing product (1.2 kg) | Pneumatic tire provided only with a liquid self-sealing product (1 kg of product) | Pneumatic tire according to the invention (OS: 1.2 kg, OL: 0.6 kg) |
| --- | --- | --- | --- |
| % Degree of cover after perforation | 10 | 100 | 83 |
| % Degree of cover after perforation and running for 6 h at v = 70 km/h | 50 | 100 | 92.5 |
| % Degree of cover after pulling out at a time T | 70 | 0 | 75 |
| % Degree of cover after pulling out at a time T + 1 h | 70 | 0 | 90 |

It could be observed, as summarized in the first line of the table, that the degree of cover of a pneumatic tire provided only with a solid self-sealing product is 10% immediately after a perforation. This is explained by the fact that the solid self-sealing product takes a certain time before yielding and filling in the perforation. A pneumatic tire provided only with a liquid self-sealing product benefits from a degree of cover of 100% as the liquid state makes it possible for the self-sealing product to rapidly fill in the perforation.

Then, after running for 6 h at a speed of 70 km/h, as summarized in the second line of the table, the degree of cover of the tire provided only with a solid self-sealing product increases as the product has been able to yield and to partially fill in the perforation. Likewise, the pneumatic tire according to the invention increases its degree of cover. The degree of cover of a pneumatic tire provided only with a liquid self-sealing product remains 100%.

On the other hand, when the screw is pulled out, as may be observed by reading the third line of the table, the degree of cover of the pneumatic tire provided only with a liquid self-sealing product falls to zero as there is nothing left to hold back the liquid self-sealing product, which flows out of the tire. This is not the case with the pneumatic tire provided only with a solid self-sealing product, which has been able to yield while remaining in the tire in place despite the screw being pulled out, and makes possible a degree of cover of 70%. For its part, the pneumatic tire according to the invention benefits from a degree of cover of 75%. It is thus observed that the performance qualities of this tire are not the simple juxtaposition or addition of the performance qualities of a solid self-sealing product alone and of a liquid self-sealing product alone as it makes it possible to obtain an improvement in the degree of cover immediately after pulling out which is greater (75% instead of 70%) There is thus clearly a synergy between the two types of products.

This synergistic effect is even more noteworthy when the degree of cover one hour after the screw has been pulled out is observed. This is because, whereas neither the pneumatic tire provided only with a solid self-sealing product nor the pneumatic tire provided only with a liquid self-sealing product increase their degree of cover, the pneumatic tire according to the invention increases its up to 90%, making possible a gain of 20% in the degree of cover. Again, this degree is not the fruit of a simple juxtaposition or addition of the performance qualities of the liquid or solid self-sealing products alone but clearly the result of a synergy between these two complementary products.

Processes for the manufacture of an assembly of a pneumatic tire and of a wheel, the tire of the assembly being, for example, according to one of the embodiments touched on above, will now be described.

In a first manufacturing process, the liquid self-sealing product OL is housed in the pneumatic tire 10 before it is fitted to the wheel.

In a second manufacturing process, the liquid self-sealing product OL is introduced into the pneumatic tire 10 after it has been fitted to the wheel via a valve for inflation of the pneumatic tire 10. The introduction of the liquid self-sealing product OL is also carried out before the inflation of the pneumatic tire 10.

A process for deploying a self-sealing system in an assembly of a pneumatic tire and of a wheel, the tire of the assembly being, for example, according to one of the embodiments touched on above, will now be described.

During this process, the starting point is to take a pneumatic tire equipped with a layer comprising the solid self-sealing product OS.

The pneumatic tire is then fitted to a wheel rim in order to obtain an assembly of a pneumatic tire and of a wheel defining a internal volume V. The liquid self-sealing product OL is subsequently introduced into the internal volume V.

The liquid self-sealing product OL is introduced into the internal volume V of the pneumatic tire before the pneumatic tire is fitted to the wheel rim.

If the assembly of a pneumatic tire 10 and of a wheel is provided with an inflation valve, the liquid self-sealing product OL is introduced through the said inflation valve after the pneumatic tire has been fitted to the wheel rim.

The invention is not limited to the embodiments touched on above and other embodiments will be apparent to a person skilled in the art. For example, it will be possible to envisage other combinations than those described of elements present in the compositions touched on above.

The invention claimed is:

1. Assembly of a pneumatic tire and of a wheel, the pneumatic tire being mounted to the wheel,
   wherein an internal surface of the pneumatic tire comprises an airtight inner liner layer which delimits, at least in part, an internal volume of the pneumatic tire, and wherein the pneumatic tire comprises first and second self-sealing products housed in the internal volume of the pneumatic tire,
   the first self-sealing product, referred to as solid self-sealing product, forming a layer against a predetermined part of the internal surface of the pneumatic tire, the relative position of this predetermined part in the pneumatic tire not substantially varying under the effect of gravity, the second self-sealing product, referred to as liquid self-sealing product, being in a liquid form, the relative position of the second self-sealing product varying under the effect of gravity in the internal volume of the pneumatic tire in order to make it possible to act simultaneously with the first self-sealing product.

2. The assembly of a pneumatic tire and of a wheel according to claim 1, wherein the liquid self-sealing product has an equivalent thickness (e) of between 0.3 and 2.5 mm, this equivalent thickness being defined by the relationship $$e = \frac{w}{WD\gamma},$$

in which:
w is the weight of liquid self-sealing product,
W is the width of the tread of the pneumatic tire,
D is the internal development of the pneumatic tire, and
γ is the density of the liquid self-sealing product.

3. The assembly of a pneumatic tire and of a wheel according to claim 2, wherein the equivalent thickness of the liquid self-sealing product is between 0.4 and 1.5 mm.

4. The assembly of a pneumatic tire and of a wheel according to claim 1, wherein the dynamic viscosity of the liquid self-sealing product is less than 1000 Pa·s within a temperature range of between −15° C. and 60° C.

5. The assembly of a pneumatic tire and of a wheel according to claim 4, wherein the dynamic viscosity of the liquid self-sealing product is greater than 0.01 Pa·s.

6. The assembly of a pneumatic tire and of a wheel according to claim 1, wherein the layer of solid self-sealing product has a thickness of less than 4 mm.

7. The assembly of a pneumatic tire and of a wheel according to claim 1, wherein the predetermined part covered with the solid self-sealing product is a part facing the crown of the pneumatic tire.

8. The assembly of a pneumatic tire and of a wheel according to claim 1, wherein the liquid self-sealing product comprises filling-in agents.

9. The assembly of a pneumatic tire and of a wheel according to claim 7, wherein the liquid self-sealing product comprises a latex of natural rubber in an aqueous base.

10. The assembly of a pneumatic tire and of a wheel according to claim 1, wherein the liquid self-sealing product comprises an antifreeze.

11. The assembly of a pneumatic tire and of a wheel according to claim 10, wherein the antifreeze is based on glycol.

12. The assembly of a pneumatic tire and of a wheel according to claim 1, wherein the liquid self-sealing product comprises particles with a diameter of between 10 and 800 µm.

13. The assembly of a pneumatic tire and of a wheel according to claim 1, wherein the solid self-sealing product comprises a predominant elastomer chosen from:
an unsaturated diene elastomer,
a butyl-based elastomer,
a thermoplastic elastomer, and
a polyurethane.

14. The assembly of a pneumatic tire and of a wheel according to claim 13, wherein, the major elastomer being an unsaturated diene elastomer, the solid self-sealing product additionally comprises between 30 and 90 phr of a hydrocarbon resin and between 0 and 30 phr of a filler.

15. The assembly of a pneumatic tire and of a wheel according to claim 14, wherein the solid self-sealing product additionally comprises a liquid plasticizer at a content of between 0 and 60 phr or additionally comprises between 0.5 and 15 phr of thiuram polysulfide.

16. The assembly of a pneumatic tire and of a wheel according to claim 13, wherein, the major elastomer being a butyl-based elastomer, the major elastomer is a butyl rubber of high molecular weight, and the solid self-sealing product additionally comprises a butyl elastomer of low molecular weight.

17. The assembly of a pneumatic tire and of a wheel according to claim 15, wherein the number-average molecular weight of the butyl rubber of high molecular weight is greater than 120 000 g/ml.

18. The assembly of a pneumatic tire and of a wheel according to claim 13, wherein, the major elastomer being a thermoplastic elastomer, the solid self-sealing product additionally comprises an extending oil at a content of at least 100 phr.

19. The assembly of a pneumatic tire and of a wheel according to claim 1, wherein the solid self-sealing product has a Shore 00 hardness of less than 10.

20. Process for the manufacture of an assembly of a pneumatic tire and of a wheel, wherein the assembly is according to claim 1, and wherein the liquid self-sealing product is housed in the pneumatic tire before it is mounted to the wheel.

21. Process for the manufacture of an assembly of a pneumatic tire and of a wheel, wherein the assembly is according to claim 1, and wherein the liquid self-sealing product is introduced into the pneumatic tire after it has been mounted to the wheel via a valve for inflation of the pneumatic tire and before the inflation of the pneumatic tire.

22. Process for deploying a self-sealing system in an assembly of a pneumatic tire and of a wheel, wherein the assembly is according to claim 1, and wherein the process comprises:
a pneumatic tire equipped with a layer comprising the solid self-sealing product is taken;
the pneumatic tire is mounted to a wheel rim in order to obtain an assembly of a pneumatic tire and of a wheel defining an internal volume;
the liquid self-sealing product is introduced into the internal volume.

23. The process according to claim 22, wherein the liquid self-sealing product is introduced into the internal volume of the pneumatic tire before the pneumatic tire is mounted to the wheel rim.

24. The process according to claim 22, wherein, the assembly of a pneumatic tire and of a wheel being provided with an inflation valve, the liquid self-sealing product is introduced through the inflation valve after the pneumatic tire has been mounted to the wheel rim.

* * * * *